United States Patent
Inoue et al.

(10) Patent No.: US 11,500,580 B2
(45) Date of Patent: Nov. 15, 2022

(54) MEMORY SYSTEM

(71) Applicant: Kioxia Corporation, Tokyo (JP)

(72) Inventors: Ryo Inoue, Yamato (JP); Minoru Oda, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/375,129

(22) Filed: Jul. 14, 2021

(65) Prior Publication Data

US 2022/0244884 A1    Aug. 4, 2022

(30) Foreign Application Priority Data

Feb. 2, 2021   (JP) .............................. JP2021-015057

(51) Int. Cl.
    *G06F 3/06*        (2006.01)

(52) U.S. Cl.
    CPC .......... *G06F 3/0655* (2013.01); *G06F 3/0622* (2013.01); *G06F 3/0679* (2013.01)

(58) Field of Classification Search
    CPC ..... G06F 3/0655; G06F 3/0622; G06F 3/0679
    See application file for complete search history.

(56) References Cited

U.S. PATENT DOCUMENTS

| | | | |
|---|---|---|---|
| 7,788,537 B1 | 8/2010 | Yellen et al. | |
| 8,583,960 B2 | 11/2013 | Settsu | |
| 8,762,790 B2 | 6/2014 | McCoy | |
| 2020/0133563 A1* | 4/2020 | Springberg | ......... G06F 12/0246 |
| 2020/0194064 A1* | 6/2020 | Barndt | ................. G11C 29/781 |
| 2020/0241794 A1* | 7/2020 | Yeo | ...................... G06F 12/1408 |
| 2020/0373943 A1* | 11/2020 | Cho | ..................... G06F 11/1048 |
| 2020/0401508 A1* | 12/2020 | Hsu | ..................... G06F 13/1673 |

FOREIGN PATENT DOCUMENTS

JP            5225515 B2     7/2013

* cited by examiner

*Primary Examiner* — Zhuo H Li

(74) *Attorney, Agent, or Firm* — Oblon, McClelland, Maier & Neustadt, L.L.P.

(57) ABSTRACT

According to one embodiment, a memory system includes a first memory and a controller. The controller includes first and second decoders, first and second circuits, a register, and a switching circuit. The first and second decoders decode first and second commands respectively, which include first and second addresses respectively. The first and second circuits access the first memory using the first and second addresses respectively. A value stored in the register is changeable by a host. The switching circuit switches between the first and second circuits to access the first memory according to the value in the register.

17 Claims, 9 Drawing Sheets

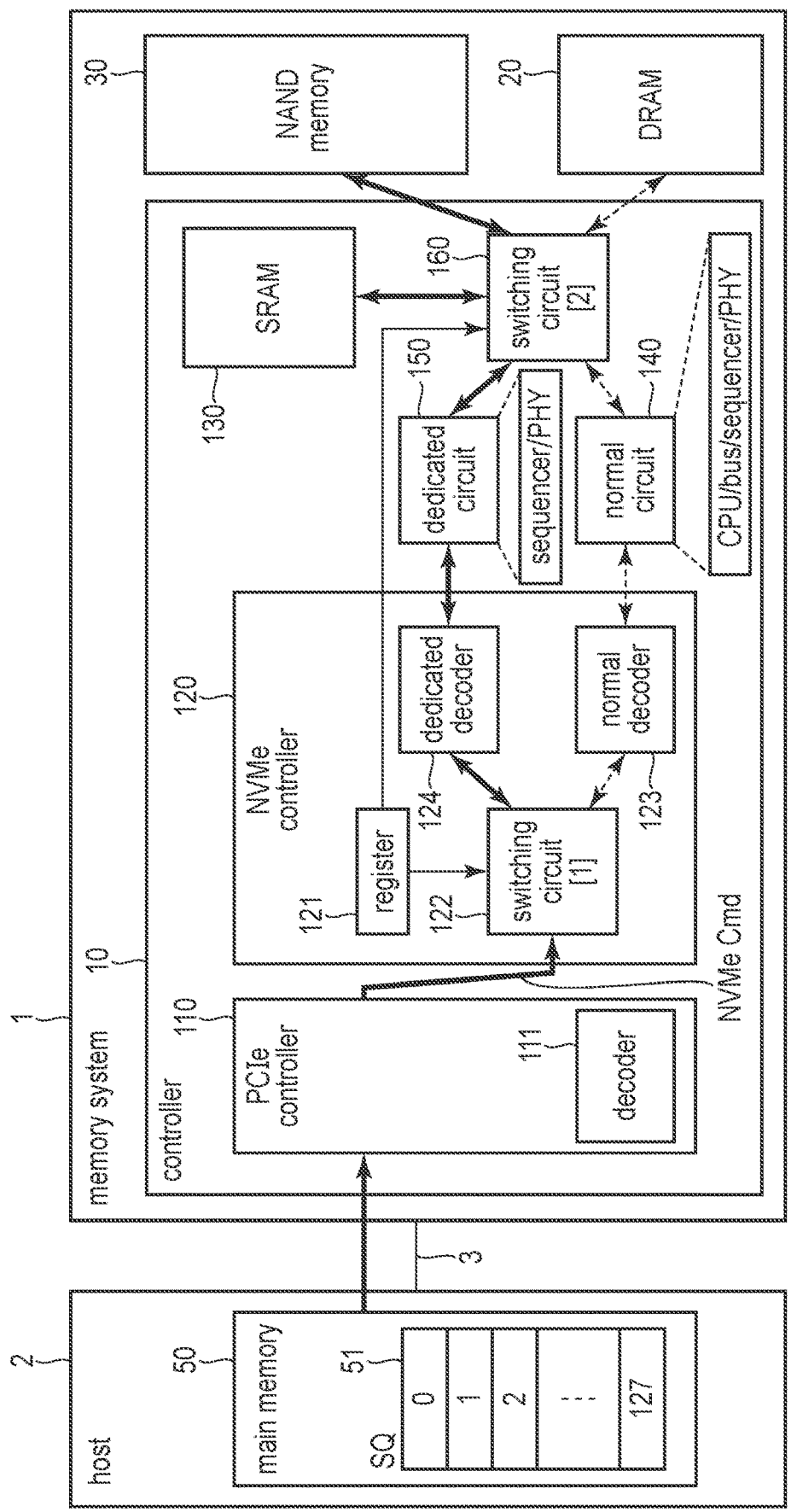
F I G. 1

MEMORY SYSTEM

CROSS-REFERENCE TO RELATED APPLICATIONS

This application is based upon and claims the benefit of priority from Japanese Patent Applications No. 2021-015057, filed Feb. 2, 2021, the entire contents of which are incorporated herein by reference.

FIELD

Embodiments described herein relate generally to a memory system.

BACKGROUND

In recent years, a memory system including a nonvolatile memory has been widely used. For example, a solid state drive (SSD) including a NAND flash memory (NAND memory) is used as a storage of an information processing apparatus such as a server or a personal computer.

When a failure occurs in the SSD, there is a possibility that information for assisting debugging remains in the SSD. However, in a case of a failure in which a CPU or a bus in a controller that controls the NAND memory hangs up, it is not possible to acquire the information.

In the first place, the acquisition of the information is a very troublesome work, for example, a dedicated device called a debugger needs to be connected to the SSD and operated.

BRIEF DESCRIPTION OF THE DRAWINGS

FIG. 1 is a diagram illustrating an example of a configuration of a memory system of a first embodiment connected to a host.

DETAILED DESCRIPTION

Figure 2:
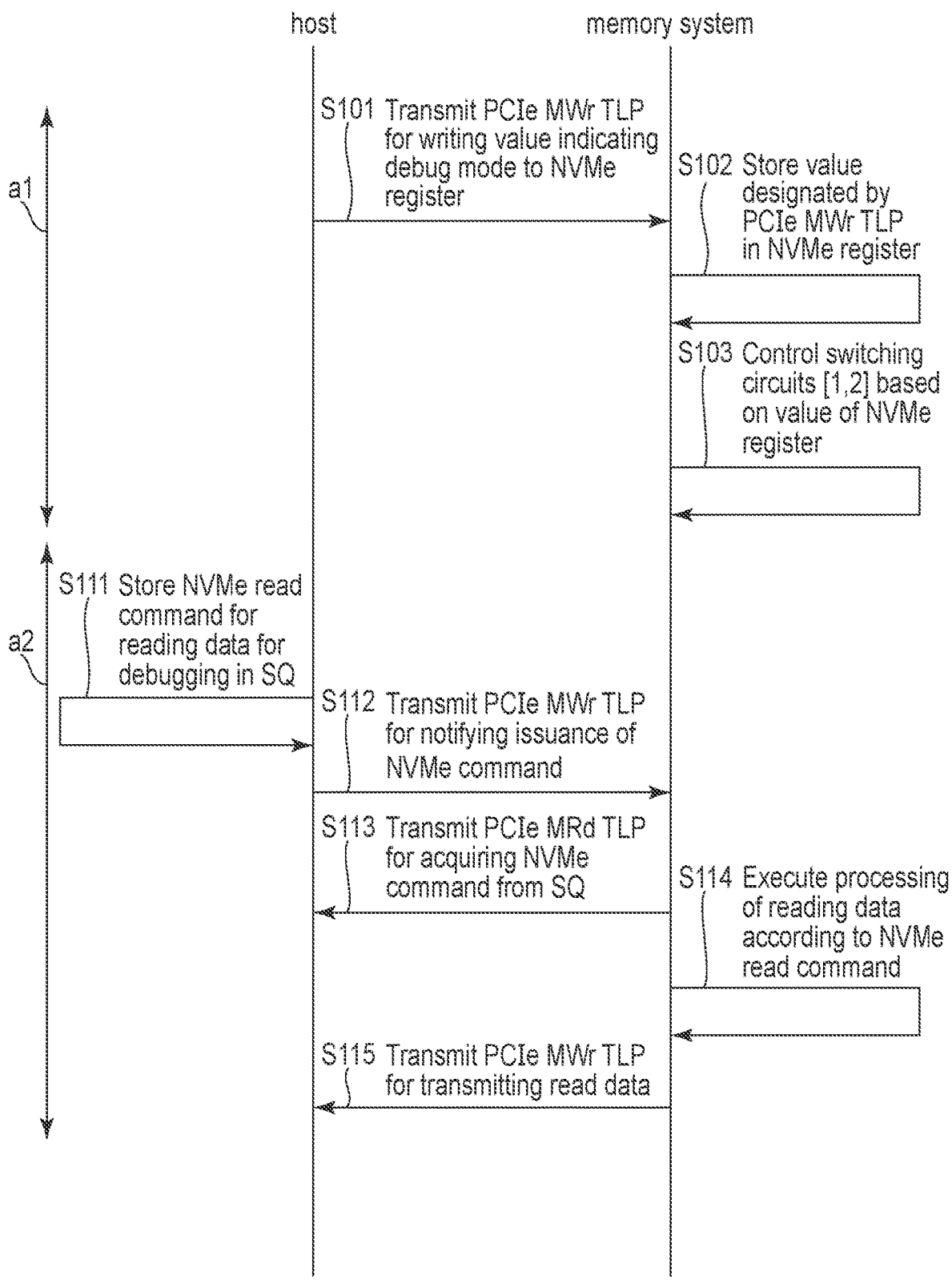
FIG. 2 is a sequence diagram illustrating a flow of operation in a debug mode of the memory system of the first embodiment and the host.

Embodiments will be described hereinafter with reference to the accompanying drawings.

In general, according to one embodiment, a memory system includes a first memory and a controller. The controller is capable of communicating with a host and is configured to control the first memory. The controller includes a first decoder, a second decoder, a first circuit, a second circuit, a first register and a switching circuit. The first decoder is configured to decode a first command received from the host. The first command includes a first address. The second decoder is configured to decode a second command received from the host. The second command includes a second address. The first circuit is configured to access the first memory using the first address acquired from the first command by the first decoder. The second circuit is configured to access the first memory using the second address acquired from the second command by the second decoder. A value stored in the first register is changeable by the host. The switching circuit is configured to switch between the first circuit and the second circuit to access the first memory according to the value stored in the first register.

First Embodiment

First, a first embodiment will be described.

FIG. 1 is a diagram illustrating an example of a configuration of a memory system 1 of the first embodiment. FIG. 1 also illustrates an example of a configuration of an information processing system including the memory system 1, a host 2 connected to the memory system 1, and an interface 3 that connects the memory system 1 and the host 2.

The host 2 is an information processing apparatus such as a server or a personal computer. The interface 3 connects the host 2 and the memory system 1. The interface 3 conforms to, for example, the PCI Express (PCIe)™ specification.

The memory system 1 may be implemented as a storage device such as an SSD. Here, an example in which the memory system 1 is implemented as an SSD will be described. The memory system 1 communicates with the host 2 using, for example, a protocol conforming to the NVM Express (NVMe)™ specification.

The memory system 1 includes a controller 10, a dynamic random access memory (DRAM) 20, and a NAND memory 30.

The controller 10 is configured as, for example, a system-on-a-chip (SoC). The function of each module of the controller 10 may be implemented by dedicated hardware, a processor that executes a program (firmware), or a combination thereof.

The controller 10 executes processing of writing data transmitted from the host 2 to the NAND memory 30, processing of reading data requested by the host 2 from the NAND memory 30, and the like based on a command issued by the host 2. The controller 10 uses the DRAM 20 as a buffer that temporarily stores data to be written to the NAND memory 30 and data read from the NAND memory 30. The controller 10 may use a static random access memory (SRAM) 130 in the controller 10 as a buffer. In a case where various regions including the buffer are allocated in the SRAM 130 or the like, instead of the DRAM 20, the memory system 1 may not be equipped with the DRAM 20.

Here, a flow of operations of the host 2 and the memory system 1 for passing a command from the host 2 to the memory system 1 will be described.

The host 2 includes a main memory 50. The main memory 50 is, for example, an SRAM. The host 2 constructs a submission queue (SQ) 51 that stores a command for the memory system 1 on the main memory 50. The SQ 51 has a capacity capable of storing, for example, up to 128 commands (NVMe commands) in a format conforming to the NVMe specification. The host 2 stores an NVMe command for requesting writing or reading of data in the SQ 51. Then, the host 2 transmits a packet in a format conforming to the PCIe specification, which is called a PCIe packet, to the memory system 1 for giving a notification of issuance of the NVMe command.

The PCIe packet is a packet for performing writing to a register in the memory system 1, more specifically, a register in the controller 10. This PCIe packet is called a PCIe memory write transaction layer packet (PCIe MWr TLP). Using this PCIe packet, the host 2 writes a value indicating that the NVMe command is stored in the SQ 51 to a predetermined register in the controller 10 or a predetermined region of the SRAM 130.

Regarding the SQ 51, the memory system 1 manages a head pointer and a tail pointer. By writing to the predetermined register or the predetermined region of the SRAM 130, the host 2 updates the tail pointer from among the head pointer and the tail pointer.

The memory system 1 recognizes that the NVMe command is stored in the SQ 51 when writing to the predetermined register or the predetermined region of the SRAM 130 is performed, resulting in a mismatch between the head pointer and the tail pointer. The memory system 1 transmits a PCIe packet for reading the NVMe command from the SQ 51 to the host 2. This PCIe packet is called a PCIe memory read transaction layer packet (PCIe MRd TLP). In response to this PCIe packet, the host 2 transmits the NVMe command in the SQ 51 to the memory system 1. The memory system 1 stores the NVMe command in the SRAM 130. When the NVMe command is read from the SQ 51, the memory system 1 updates the head pointer and makes the head pointer match with the tail pointer.

As described above, the NVMe command issued from the host 2 to the memory system 1 is passed from the host 2 to the memory system 1 through transmission and reception of PCIe packets between the host 2 and the memory system 1.

The controller 10 includes a PCIe controller 110, an NVMe controller 120, the SRAM 130, a normal circuit 140, a dedicated circuit 150, and a switching circuit [2] 160.

The PCIe controller 110 executes processing, including transmission and reception, related to PCIe packets. The PCIe controller 110 includes a decoder 111. The decoder 111 decodes a PCIe packet received from the host 2. Specifically, the decoder 111 analyzes the type of the PCIe packet. When the PCIe packet received from the host 2 is a PCIe MWr TLP requesting writing of data to the register or the SRAM 130 or a PCIe MRd TLP requesting reading of data from the register or the SRAM 130, the decoder 111 acquires information (e.g., address) indicating the register to be accessed, information (e.g., data) to be written, and the like from the PCIe packet. The PCIe controller 110 executes processing of writing data to the register and processing of reading data from the register based on the decoded result by the decoder 111. The PCIe controller 110 generates a PCIe packet and transmits the PCIe packet to the host 2 according to an instruction from the NVMe controller 120.

The NVMe controller 120 cooperates with the PCIe controller 110 to execute processing related to reception and response of an NVMe command. The NVMe controller 120 includes a register 121, a switching circuit [1] 122, a normal decoder 123, and a dedicated decoder 124. The register 121, the switching circuit [1] 122, and the dedicated decoder 124 are components unique to the memory system 1 of the first embodiment, and these will be described later.

As described above, when the host 2 issues an NVMe command, a predetermined register (not illustrated) in the controller 10 or a predetermined region of the SRAM 130 is written. In response to this writing, the NVMe controller 120 instructs the PCIe controller 110 to acquire the NVMe command from the host 2. The PCIe controller 110, which has received the instruction, generates a PCIe packet (PCIe MRd TLP) for reading the NVMe command from the SQ 51 and transmits the PCIe MRd TLP to the host 2.

The normal decoder 123 decodes the acquired NVMe command. Specifically, the normal decoder 123 analyzes the type of the NVMe command. When the NVMe command is a command for requesting writing of data to the NAND memory 30 (i.e., NVMe write command) or a command for requesting reading of data from the NAND memory 30 (i.e., NVMe read command), the normal decoder 123 acquires, from the NVMe command, a logical address that is associated with data stored in the NAND memory 30. The logical address is, for example, a logical block address (LBA).

The normal circuit 140 executes processing according to the NVMe command received and interpreted by the NVMe controller 120. For example, when the NVMe command is an NVMe read command, the normal circuit 140 translates the logical address acquired by the normal decoder 123 into a physical address indicating a physical location on the NAND memory 30, and executes reading of data from the location indicated by the physical address on the NAND memory 30. The translation from the logical address into the physical address is referred to as a logical-to-physical address translation, for example.

The normal circuit 140 includes a central processing unit (CPU), a bus, a sequencer, and a physical layer (PHY). The CPU executes a program called firmware for controlling hardware in the memory system 1. The bus is a signal line that connects the CPU and the hardware controlled by the CPU. The sequencer controls transmission and reception of data to and from the DRAM 20 and the NAND memory 30 via the PHY in accordance with a predetermined rule. The PHY is a module for achieving a function of the physical layer of the lowest layer in the Open Systems Interconnection (OSI) hierarchical model. The PHY controls output of a signal to the DRAM 20 or the NAND memory 30 and input of a signal from the DRAM 20 or the NAND memory 30.

In the description below, the DRAM 20 and the NAND memory 30 existing outside the controller 10 may be collectively referred to as an external memory, and the SRAM 130 and the register existing inside the controller 10 may be collectively referred to as an internal memory.

The dedicated circuit 150 is a component unique to the memory system 1 of the first embodiment provided separately from the normal circuit 140. The dedicated circuit 150 accesses the DRAM 20, the NAND memory 30, or the SRAM 130 without the CPU or the bus.

A plurality of dedicated circuits 150 are provided on a one-to-one basis with respect to the DRAM 20, the NAND memory 30, and the SRAM 130. In a case where a register in the controller 10 is to be accessed without the CPU or the bus, for example, a dedicated circuit 150 is further provided for each group or type of register.

The dedicated circuit 150 provided for the external memory includes a sequencer, a PHY, and the like for communicating with the external memory. The dedicated circuit 150 provided for the internal memory includes a circuit that controls input/output of data to/from the internal memory.

In contrast to the normal circuit 140 that receives a logical address from the NVMe controller 120 and executes access to the NAND memory 30, the dedicated circuit 150 receives a physical address from the NVMe controller 120 and executes access to the NAND memory 30 and the like. The acquisition of the physical address by the NVMe controller 120 will be described later.

The switching circuit [2] 160 is also a component unique to the memory system 1 of the first embodiment. The switching circuit [2] 160 switches connection targets of the DRAM 20, the NAND memory 30, the SRAM 130, and the register between the normal circuit 140 and the dedicated circuit 150. The plurality of switching circuits [2] 160 are provided on a one-to-one basis for the plurality of dedicated circuits 150.

Here, it is assumed that a failure occurs in the memory system 1. In this case, information that assists in debugging may remain in the DRAM 20, the NAND memory 30, the SRAM 130, or a register in the controller 10. Conventionally, in a case of a failure in which a CPU or a bus in the controller 10 hangs up, it is not possible to acquire the information. Even when the CPU and the bus are operating normally, to acquire the information from the DRAM 20, the SRAM 130, and the register, it is necessary to connect a dedicated device called a debugger to the memory system 1 and operate the debugger.

The memory system 1 of the first embodiment can acquire these pieces of information from the host 2 even in a case of a failure in which the CPU or the bus in the controller 10 hangs up.

In a normal operation (i.e., in a normal mode), when reading data from the NAND memory 30, the host 2 stores in the SQ 51 an NVMe read command that includes a logical address. On the other hand, at the time of debugging (i.e., in a debug mode), for example, when the NVMe read command is allocated as a command for data acquisition at the time of debugging, the host 2 stores in the SQ 51 the NVMe read command that includes a physical address instead of a logical address. This physical address may be the same as that obtained by the normal circuit 140 by the logical-to-physical address translation, or may indicate a channel, block, bank, and the like of the NAND memory 30 by a unique rule. The physical address may be any address as long as the corresponding dedicated circuit 150 can specify the physical location on the external memory or the internal memory.

The physical address included in the NVMe read command at the time of debugging is not limited to the NAND memory 30, and may be related to the physical address of the DRAM 20 or the physical address of the SRAM 130. That is, the host 2 can request not only reading of data from the NAND memory 30 but also reading of data from the DRAM 20 or reading of data from the SRAM 130 using the NVMe read command. In a case where the register in the controller 10 is an access target at the time of debugging, the host 2 can request reading of data from the register using the NVMe read command that includes the physical address of the register.

Not limited to the NVMe read command, the host 2 can also issue an NVMe write command that requests writing to the NAND memory 30, the DRAM 20, the SRAM 130, or a register in the controller 10. That is, it is also possible to designate a physical address of the external memory or the internal memory and request writing of data to the designated physical address of the external memory or the internal memory.

The register 121 in the NVMe controller 120 is a register provided for the host 2 to notify the memory system 1 of transitioning from the normal mode to the debug mode. Specifically, the register 121 stores one of a value indicating the normal mode and a value indicating the debug mode. The register 121 may be implemented by diverting a reserved region in the NVMe register, for example. When the memory system 1 is activated or reset, a value indicating the normal mode is stored in the register 121 as a default value.

At the time of debugging, the host 2 writes data to the register 121 in the NVMe controller 120 when reading data from the external memory or the internal memory using the NVMe read command. More specifically, to notify the memory system 1 of transitioning from the normal mode to the debug mode, a value indicating the debug mode is written to the register 121. Writing of data into the register 121 can be requested using a PCIe packet (PCIe MWr TLP).

The switching circuit [1] 122 switches a supply target of the NVMe command, which is acquired through transmission and reception of PCIe packets by the PCIe controller 110, between the normal decoder 123 and the dedicated decoder 124. The NVMe controller 120 controls the switching circuit [1] 122 based on the value of the register 121. Specifically, when the value of the register 121 is a value indicating the debug mode, the NVMe controller 120 controls the switching circuit [1] 122 so that the supply target of the NVMe command becomes the dedicated decoder 124. The NVMe controller 120 also executes control of the switching circuit [2] 160 in parallel with control of the switching circuit [1] 122. Specifically, the NVMe controller 120 controls the switching circuit [2] 160 so that the connection target of the DRAM 20, the NAND memory 30, the SRAM 130, or the register becomes the dedicated circuit 150.

After transmitting the PCIe packet (PCIe MWr TLP) requesting writing of data to the register 121 to the memory system 1, the host 2 issues an NVMe read command including, for example, a physical address of the NAND memory 30 to the memory system 1. Specifically, the host 2 stores the NVMe read command in the SQ 51, and transmits a PCIe packet (PCIe MWr TLP) for giving a notification of issuance of the NVMe read command to the memory system 1. In the memory system 1 in the debug mode, the NVMe read command acquired from the SQ 51 of the host 2 is supplied to the dedicated decoder 124 via the switching circuit [1] 122.

The dedicated decoder 124 also analyzes the NVMe read command similarly to the normal decoder 123. As described above, in the case of the NVMe read command, the normal decoder 123 acquires the logical address of target data from the NVMe read command. On the other hand, the dedicated decoder 124 acquires the physical addresses of the DRAM 20, the NAND memory 30, the SRAM 130, and the like from the NVMe read command. This physical address may be stored, for example, in a start-LBA (SLBA) field (described later) of the NVMe read command in which the logical address is originally stored. The dedicated decoder 124 specifies an access target from the physical address, for example. The dedicated decoder 124 supplies the physical address to the dedicated circuit 150 corresponding to the specified access target.

When transitioning to the debug mode, the connection targets of the DRAM 20, the NAND memory 30, the SRAM 130, and the like are switched from the normal circuit 140 to the dedicated circuit 150 by the switching circuit [2] 160. The dedicated circuit 150 reads data from the location indicated by the physical address received from the dedicated decoder 124.

FIG. 2 is a sequence diagram illustrating a flow of operation of the host 2 and the memory system 1 when data is read from the memory system 1 in the debug mode.

First, the host 2 transmits a PCIe MWr TLP for writing a value indicating the debug mode to the register 121 to the memory system 1 (S101). The memory system 1 stores the value designated by the PCIe MWr TLP in the register 121 (S102). The memory system 1 controls the switching circuit [1] 122 and the switching circuit [2] 160 based on the value of the register 121 (S103). Steps S101 to S103 are the flow from the normal mode to the debug mode of the memory system 1 (a1).

Figure 3:
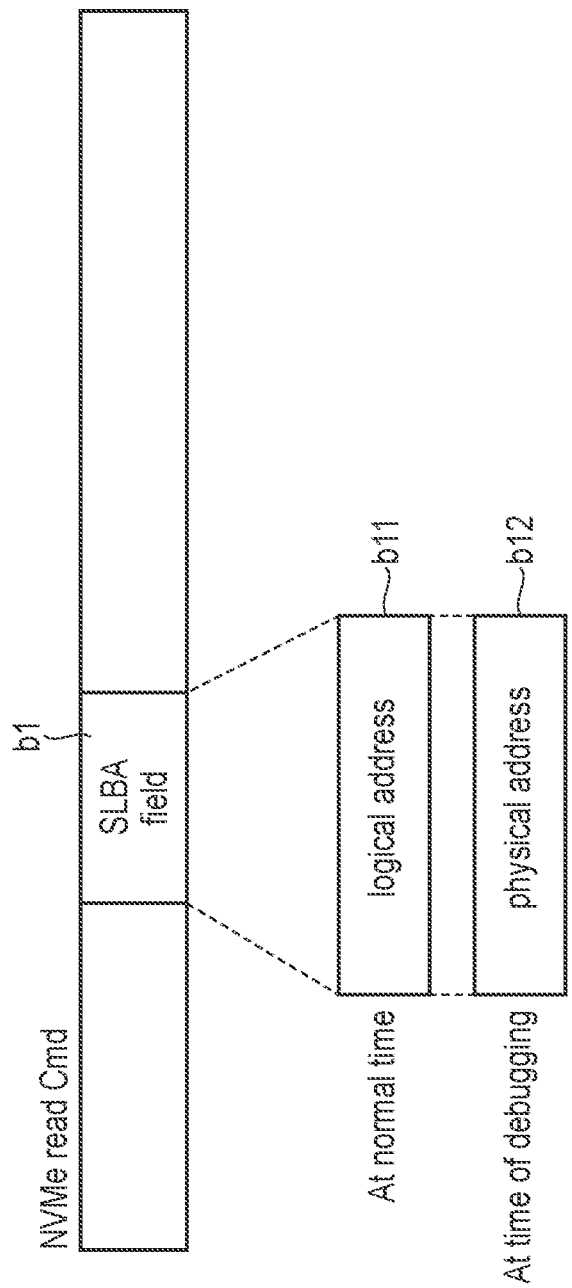
FIG. 3 is a diagram illustrating an exemplary format of an NVMe command received by the memory system of the first embodiment.

For the memory system 1 that has transitioned to the debug mode, the host 2 stores in the SQ 51 an NVMe read command for reading data for debugging (S111). The host 2 includes an access target physical address in the NVMe read command instead of the logical address of the target data in the normal mode. FIG. 3 is an exemplary diagram illustrating a format of the NVMe read command.

The NVMe read command has an SLBA field (b1). When the memory system 1 is in the normal mode, the host 2 stores a logical address (b11) in the SLBA field. On the other hand, when the memory system 1 is in the debug mode, the host 2 stores a physical address (b12) in the SLBA field. The storage location of the physical address in the debug mode may be other than the SLBA field. In this case, the dedicated decoder 124 acquires the physical address from a location other than the SLBA field.

The description returns to FIG. 2. After storing the NVMe read command in the SQ 51, the host 2 transmits a PCIe MWr TLP for making the memory system 1 acquire the NVMe command from the SQ 51 (S112). The PCIe MWr TLP is a packet for writing a value indicating that the NVMe command is stored in the SQ 51 to a predetermined register of the memory system 1.

When the predetermined register is written, the memory system 1 recognizes that the NVMe command is stored in the SQ 51. The memory system 1 transmits a PCIe MRd TLP to the host 2 for reading the NVMe command from the SQ 51(S113). The memory system 1 executes processing of reading data from the external memory (DRAM 20, NAND memory 30) or the internal memory (SRAM 130, register in controller 10) according to the NVMe read command acquired from the host 2 including the physical address (S114). The memory system 1 transmits a PCIe MWr TLP for transmitting the read data to the host 2 (S115). Steps S111 to S115 are flows in which the host 2 reads data from the memory system 1 in the debug mode (a2).

As described above, in the memory system 1 of the first embodiment, the host 2 can read data in the memory system 1 using an NVMe command by transitioning the memory system 1 to the debug mode using a PCIe packet. In the debug mode, the memory system 1 configures a bypass path for executing data reading without passing through the normal circuit 140 that includes the CPU and the bus. Therefore, in the memory system 1, even when a failure such as a hang-up of the CPU or the bus occurs, data can be read. Data can be read not only from the NAND memory 30 but also from the DRAM 20, the SRAM 130, and the register in the controller 10 using the NVMe command by the host 2, and thus it is possible to eliminate the need for work such as operating a dedicated debugger connected to the memory system 1.

Second Embodiment

Next, a second embodiment will be described.

Here, the same reference numerals are used for the same components as those of the first embodiment, and the description thereof will be omitted.

Figure 4:
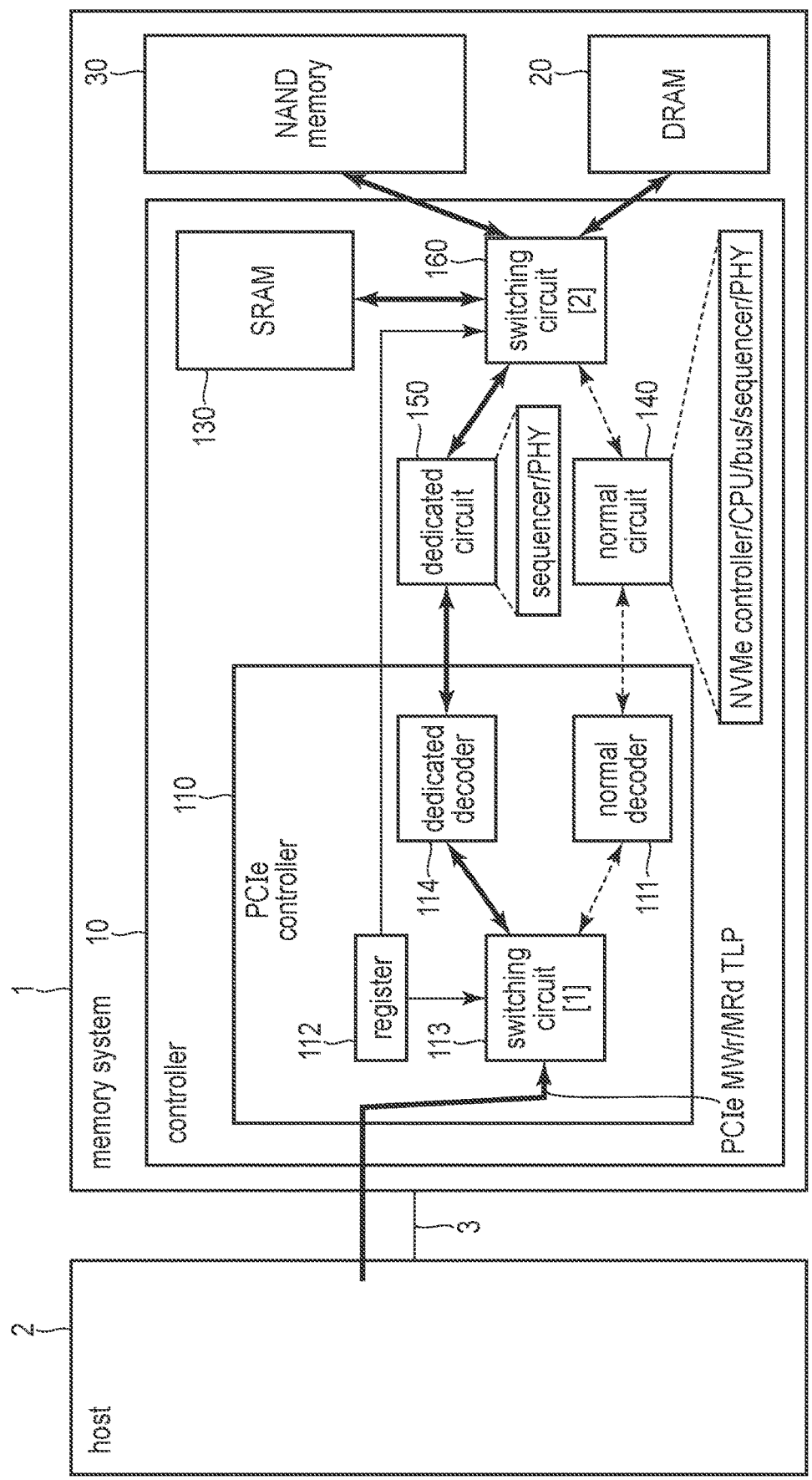
FIG. 4 is a diagram illustrating an example of a configuration a memory system of a second embodiment connected to a host.

FIG. 4 is a diagram illustrating an example of a configuration of the memory system 1 of the second embodiment. FIG. 4 also illustrates an example of a configuration of an information processing system including the memory system 1, the host 2 connected to the memory system 1, and the interface 3 that connects the memory system 1 and the host 2.

The memory system 1 of the first embodiment allows the host 2 to read data in the memory system 1 using an NVMe command at the time of debugging. That is, in the memory system 1 of the first embodiment, the communication conforming to the NVMe specification should be established with the host 2 at the time of debugging. On the other hand, in the memory system 1 of the second embodiment, the host 2 can read the data in the memory system 1 using a PCIe packet. That is, in the memory system 1 of the second embodiment, at the time of debugging, the communication conforming to the NVMe specification does not need to be established, and it is sufficient that a link conforming to the PCIe specification is established.

The normal circuit 140 in the second embodiment illustrated in FIG. 4 includes an NVMe controller having the normal decoder 123 described in the first embodiment. The NVMe controller does not include the register 121, the switching circuit [1] 122, and the dedicated decoder 124 described in the first embodiment. Instead, in the memory system 1 of the second embodiment, the PCIe controller 110 includes a normal decoder 111, a register 112, a switching circuit 113, and a dedicated decoder 114. The normal decoder 111 in FIG. 4 may have the same configuration as the decoder 111 in FIG. 1.

The register 112 is a register provided for the host 2 to notify the memory system 1 of transitioning from the normal mode to the debug mode. Specifically, the register 112 stores one of a value indicating the normal mode and a value indicating the debug mode. The register 112 is a PCIe register that can be accessed using PCIe packets (e.g., PCIe configuration read transaction layer packet [PCIe CfgRd TLP], PCIe configuration write transaction layer packet [PCIe CfgWr TLP]). When the memory system 1 is activated or reset, a value indicating the normal mode is stored in the register 112 as a default value.

The switching circuit [1] 113 switches a supply target of the PCIe packet, which is transmitted from the host 2, between the normal decoder 111 and the dedicated decoder 114. The PCIe controller 110 controls the switching circuit [1] 113 based on the value of the register 112. Specifically, when the value of the register 112 is a value indicating the debug mode, the PCIe controller 110 controls the switching circuit [1] 113 so that the supply target of the PCIe packet becomes the dedicated decoder 114. The PCIe controller 110 also executes control of the switching circuit [2] 160 in parallel with the control of the switching circuit [1] 113. Specifically, the PCIe controller 110 controls the switching circuit [2]160 so that a connection target of the DRAM 20, the NAND memory 30, the SRAM 130, and the register in the controller 10 becomes the dedicated circuit 150.

After transmitting a PCIe packet (PCIe CfgWr TLP) requesting writing of data to the register 112 to the memory system 1, the host 2 transmits a PCIe packet (PCIe MRd TLP) including, for example, a physical address of the NAND memory 30 to the memory system 1. In the memory system 1 in the debug mode, the PCIe MRd TLP is supplied to the dedicated decoder 114 via the switching circuit [1] 113.

As described in the first embodiment, the normal decoder 111 analyzes the type of a PCIe packet. When the PCIe packet is a PCIe MWr TLP requesting writing of data to the register or a PCIe MRd TLP requesting reading of data from the register, the normal decoder 111 acquires information (e.g., address) indicating the register to be accessed, information (e.g., data) to be written, and the like from the PCIe packet.

On the other hand, the dedicated decoder 114 acquires physical addresses of the DRAM 20, the NAND memory 30, and the SRAM 130 from the PCIe packet when the PCIe packet is the PCIe MWr TLP or the PCIe MRd TLP. The dedicated decoder 114 specifies an access target from the physical address, for example. That is, at the time of debugging, the host 2 includes physical addresses of the DRAM 20, the NAND memory 30, and the SRAM 130 in PCIe packets and transmits the PCIe packets to the memory system 1.

When transitioning to the debug mode, the connection targets of the DRAM 20, the NAND memory 30, the SRAM 130, and the like are switched from the normal circuit 140 to the dedicated circuit 150 by the switching circuit [2] 160. The dedicated circuit 150 reads data from the location indicated by the physical address received from the dedicated decoder 114.

Figure 5:
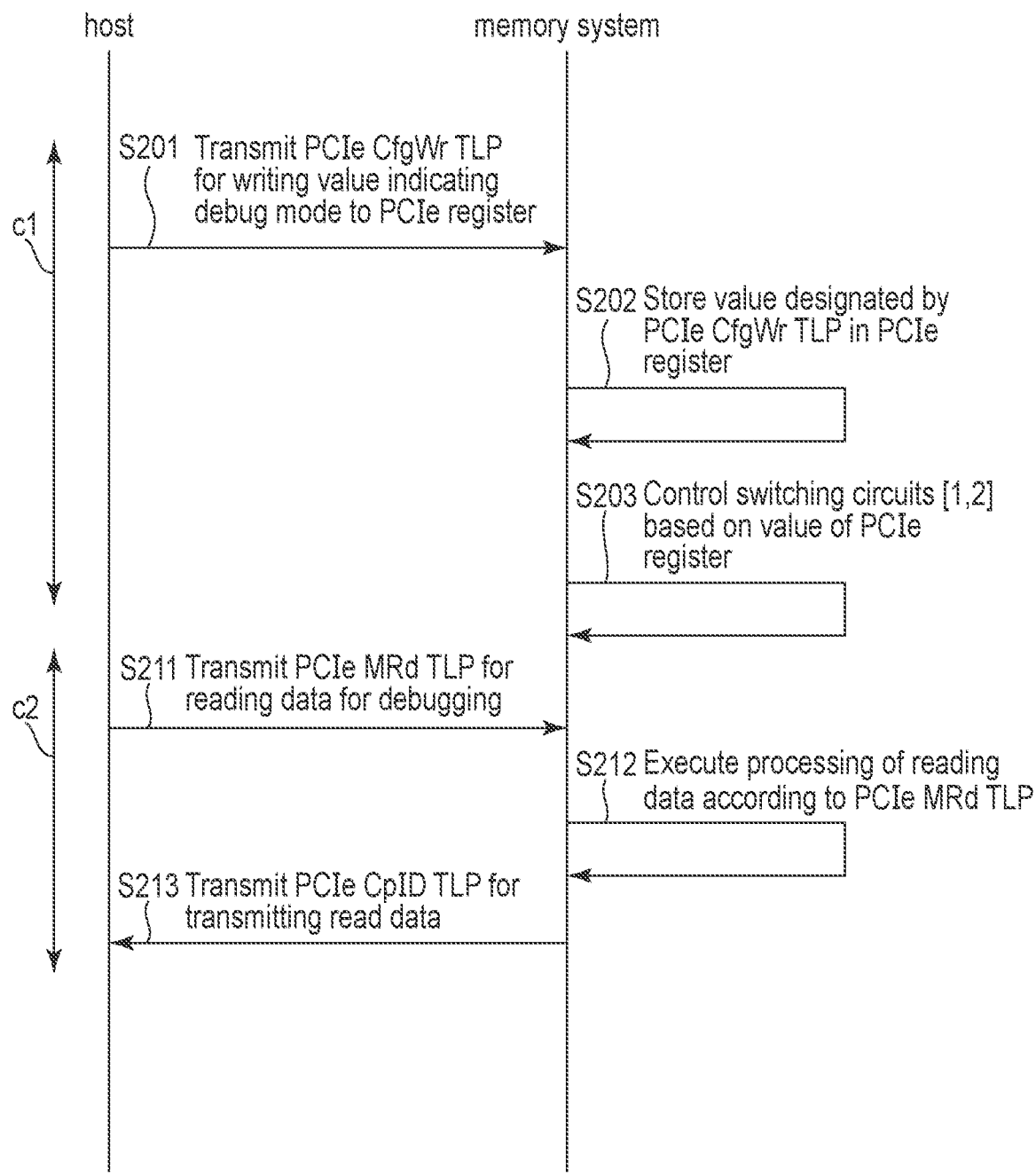
FIG. 5 is a sequence diagram illustrating a flow of operation in a debug mode of the memory system of the second embodiment and the host.

FIG. 5 is a sequence diagram illustrating a flow of operation of the host 2 and the memory system 1 when data is read from the memory system 1 in the debug mode.

First, the host 2 transmits a PCIe CfgWr TLP for writing a value indicating the debug mode to the register 112 to the memory system 1 (S201). The memory system 1 stores the value designated by the PCIe CfgWr TLP in the register 112 (S202). The memory system 1 controls the switching circuit [1] 113 and the switching circuit [2] 160 based on the value of the register 112 (S203). Steps S201 to S203 are the flow from the normal mode to the debug mode of the memory system 1 (c1).

Figure 6:
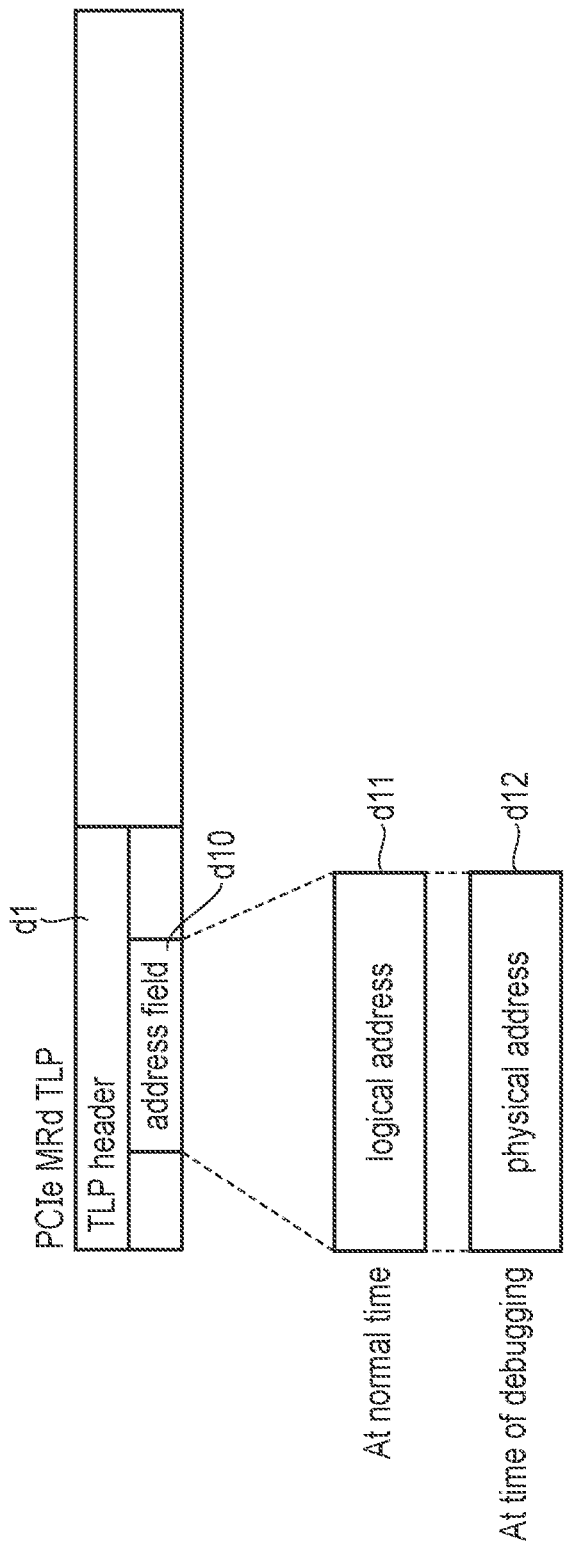
FIG. 6 is a diagram illustrating an exemplary format of a PCIe packet received by the memory system of the second embodiment.

For the memory system 1 that has transitioned to the debug mode, the host 2 transmits to the memory system 1 a PCIe MRd TLP for reading data for debugging (S211). FIG. 6 is an exemplary diagram illustrating a format of the PCIe MRd TLP.

The PCIe MRd TLP includes a TLP header (d1). The TLP header has an address field (d10). When the memory system 1 is in the normal mode, the host 2 stores a logical address (d11) in this address field. The logical address is not an address associated with data stored in the NAND memory 30 but an address indicating a location in a logical address space to which a register in the controller 10 is allocated. Specifically, this logical address is an address obtained by adding an offset address of the register to a head address of the address space defined by a base address register (BAR) described later. On the other hand, when the memory system 1 is in the debug mode, the host 2 stores, in the address field, an address (d12) obtained by adding the physical address of the external memory (DRAM 20, NAND memory 30) or the internal memory (SRAM 130, register in controller 10) to be accessed to the head address of the address space defined by the BAR. The storage location of the physical address in the debug mode may be other than the address field. In this case, the dedicated decoder 124 acquires the physical address from a location other than the address field. Alternatively, the address field and a region defined as a TLP Prefix (Vendor Defined) in the PCIe MRd TLP may be combined to be the storage location of the physical address.

The description returns to FIG. 5. The memory system 1 executes processing of reading data from the external memory (DRAM 20, NAND memory 30) or the internal memory (SRAM 130, register in controller 10) according to the PCIe MRd TLP received from the host 2 including the physical address (S212). The memory system 1 transmits a PCIe completion with data transaction layer packet (PCIe CplD TLP) for transmitting the read data to the host 2 (S213). The PCIe CplD TLP is a completion notification for the PCIe MRd TLP. Steps S211 to S213 are flows in which the host 2 reads data from the memory system 1 in the debug mode (c2).

As described above, in the memory system 1 of the second embodiment, the host 2 can read the data in the memory system 1 using the PCIe packet by transitioning the memory system 1 to the debug mode using the PCIe packet. In the debug mode, the memory system 1 configures a bypass path for executing data reading without passing through the normal circuit 140 that includes the CPU and the bus. Therefore, in the memory system 1, even when a failure such as a hang-up of the CPU or the bus occurs, data can be read. Data can be read not only from the NAND memory 30 but also from the DRAM 20, the SRAM 130, and the register in the controller 10 using the PCIe packets by the host 2, and thus it is possible to eliminate the need for work such as operating a dedicated debugger connected to the memory system 1.

Third Embodiment

Next, a third embodiment will be described. Here, the same reference numerals are used for the same components as those of the first embodiment and the second embodiment, and the description thereof will be omitted.

Figure 7:
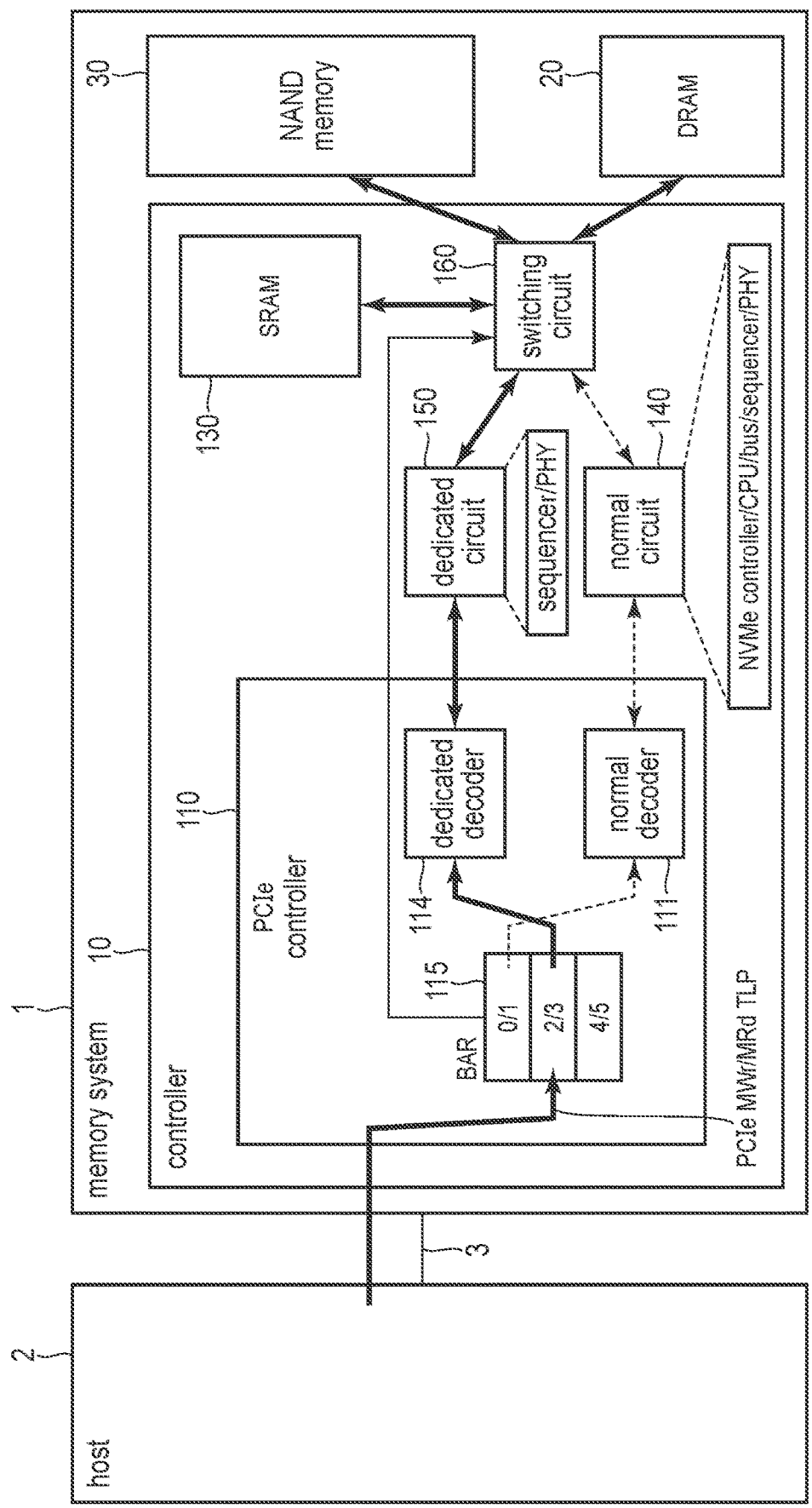
FIG. 7 is a diagram illustrating an example of a configuration of a memory system of a third embodiment connected to a host.

FIG. 7 is a diagram illustrating an example of a configuration of the memory system 1 of the third embodiment. FIG. 7 also illustrates an example of a configuration of an information processing system including the memory system 1, the host 2 connected to the memory system 1, and the interface 3 that connects the memory system 1 and the host 2.

In the memory system 1 of the second embodiment, the PCIe register 112 controls switching between the normal mode and the debug mode. On the other hand, the memory system 1 of the third embodiment controls switching between the normal mode and the debug mode using a base address register (BAR) 115. The BAR 115 is a register in which data is written using a PCIe packet (PCIe CfgWr TLP). Here, the BAR 115 will be described.

For example, it is assumed that a plurality of memory systems 1 are connected to the host 2. Each memory system 1 has various registers in the controller 10, such as a register for recognizing that an NVMe command stored in the SQ 51 of the host 2 is addressed to the memory system 1 itself. When writing data into a register of a certain memory system 1 or reading data from a register of a certain memory system 1, the host 2 transmits a PCIe MWr TLP or a PCIe MRd TLP to the memory system 1. The PCIe MWr TLP and the PCIe MRd TLP from the host 2 are transmitted to all of the memory systems 1 connected to the host 2. Each memory system 1 determines whether the received PCIe MWr TLP or PCIe MRd TLP is addressed to the memory system 1 itself. The value of the BAR 115 is used for this determination.

The host 2 allocates, for registers of each memory system 1, a region in a logical address space of the information processing system that includes the memory systems 1 connected to the host 2. This allocation is performed such that the region in the logical address space for each memory system 1 does not overlap. The host 2 writes information indicating the range of the region allocated to the registers of each memory system 1 in the logical address space to the BAR 115 of each memory system 1 using a PCIe CfgWr TLP. The PCIe CfgWr TLP is a PCIe packet that can designate identification information of each memory system 1. That is, each memory system 1 can determine whether the received PCIe CfgWr TLP is addressed to the memory system 1 itself without referring to the BAR 115. Each memory system 1 determines whether each of a PCIe MWr TLP and a PCIe MRd TLP is addressed to the memory system 1 based on whether the address included in each of the PCIe MWr TLP and the PCIe MRd TLP is within the range indicated by the BAR 115.

The BAR 115 includes six registers of BARs 0 to 5. Each of the BARs 0 to 5 has a capacity of 32 bits. On the other hand, the size of the information indicating the range of the region in the logical address space for the registers described above is, for example, 64 bits. Therefore, the BARs 0 to 5 are used in a combination of two each. Usually, the host 2 uses the BARs 0 and 1 in combination (BAR 0/1).

The host 2 can use the BARs 2 and 3 in combination (BAR 2/3), and the BARs 4 and 5 in combination (BAR 4/5). That is, the host 2 can allocate up to three regions in the logical address space for the registers of each memory system 1. In other words, the region in the logical address space for the registers allocated to each memory system 1 may be two or three separate regions. However, in a case where the logical address space of each memory system 1 can be designated only by the BAR 0/1, the BARs 2 to 5 are not used.

Thus, the memory system 1 of the third embodiment recognizes that the PCIe MRd TLP and the PCIe MRd TLP transmitted from the host 2 are addressed to the memory system 1 itself and should be processed in the debug mode using, for example, the BARs 2 and 3 in the conventionally-unused BARs 2 to 5. For example, in a case where the memory systems 1 are connected to the host 2, the host 2 writes information indicating a range of a virtual region outside the logical address space for the registers, which is different for each memory system 1, to the BAR 2/3 of the BAR 115 of each memory system 1 using the PCIe CfgWr TLP.

For example, when the logical address included in the PCIe MWr TLP is within the range of the BAR 0/1 of the BAR 115, the PCIe controller 110 recognizes that the PCIe MWr TLP is addressed to its own memory system 1 and should be processed in the normal mode. For example, the PCIe MWr TLP transmitted by the host 2 to notify the issuance of an NVMe command includes a logical address within the range of the BAR 0/1 of the BAR 115 and corresponding to a predetermined register for writing a value indicating that the NVMe command is stored in the SQ 51. The PCIe MWr TLP is decoded by the normal decoder 111, and the PCIe controller 110 writes a value indicating that the NVMe command is stored in the SQ 51 to the predetermined register. As a result, the NVMe controller of the normal circuit 140 recognizes that the NVMe command has been stored in the SQ 51. The NVMe controller instructs the PCIe controller 110 to transmit, to the host 2, a PCIe MRd TLP for acquiring the NVMe command from the SQ 51. Hereinafter, the acquired NVMe command is decoded by the decoder of the NVMe controller, and processing according to the NVMe command is executed by the normal circuit 140.

On the other hand, a PCIe MRd TLP that is transmitted from the host 2 at the time of debugging and requests to read data from the NAND memory 30, for example, includes a logical address within a range of the BAR 2/3 of the BAR 115. Accordingly, the PCIe controller 110 recognizes that the PCIe MRd TLP is addressed to its own memory system 1 and should be processed in the debug mode. In the second embodiment, for example, the physical address in the NAND memory 30 and the like is stored in the address field of the TLP header of the PCIe MRd TLP in which the logical address is originally stored. On the other hand, in the third embodiment, an address obtained by adding the physical address of the external memory (DRAM 20, NAND memory 30) or the internal memory (SRAM 130, register in controller 10) to be accessed to the head address of the address space defined by the BAR 2/3 of the BAR 115 is stored in the address field of the TLP header of the PCIe MRd TLP. This address may be stored in, for example, a TLP Prefix (Vendor Defined) instead of the address field of the TLP header.

Upon recognizing that the PCIe MRd TLP should be processed in the debug mode, the PCIe controller 110 supplies the PCIe MRd TLP to the dedicated decoder 114. The PCIe controller 110 controls the switching circuit 160 so that the connection target of the DRAM 20, the NAND memory 30, the SRAM 130, or the register becomes the dedicated circuit 150. The switching circuit 160 may have the same configuration as the switching circuit [2] 160 of the second embodiment.

As similar to the second embodiment, when the PCIe packet is the PCIe MWr TLP or the PCIe MRd TLP, the dedicated decoder 114 acquires physical addresses of the DRAM 20, the NAND memory 30, and the SRAM 130 from the PCIe packet. The dedicated circuit 150 reads data from the location indicated by the physical address received from the dedicated decoder 114.

Figure 8:
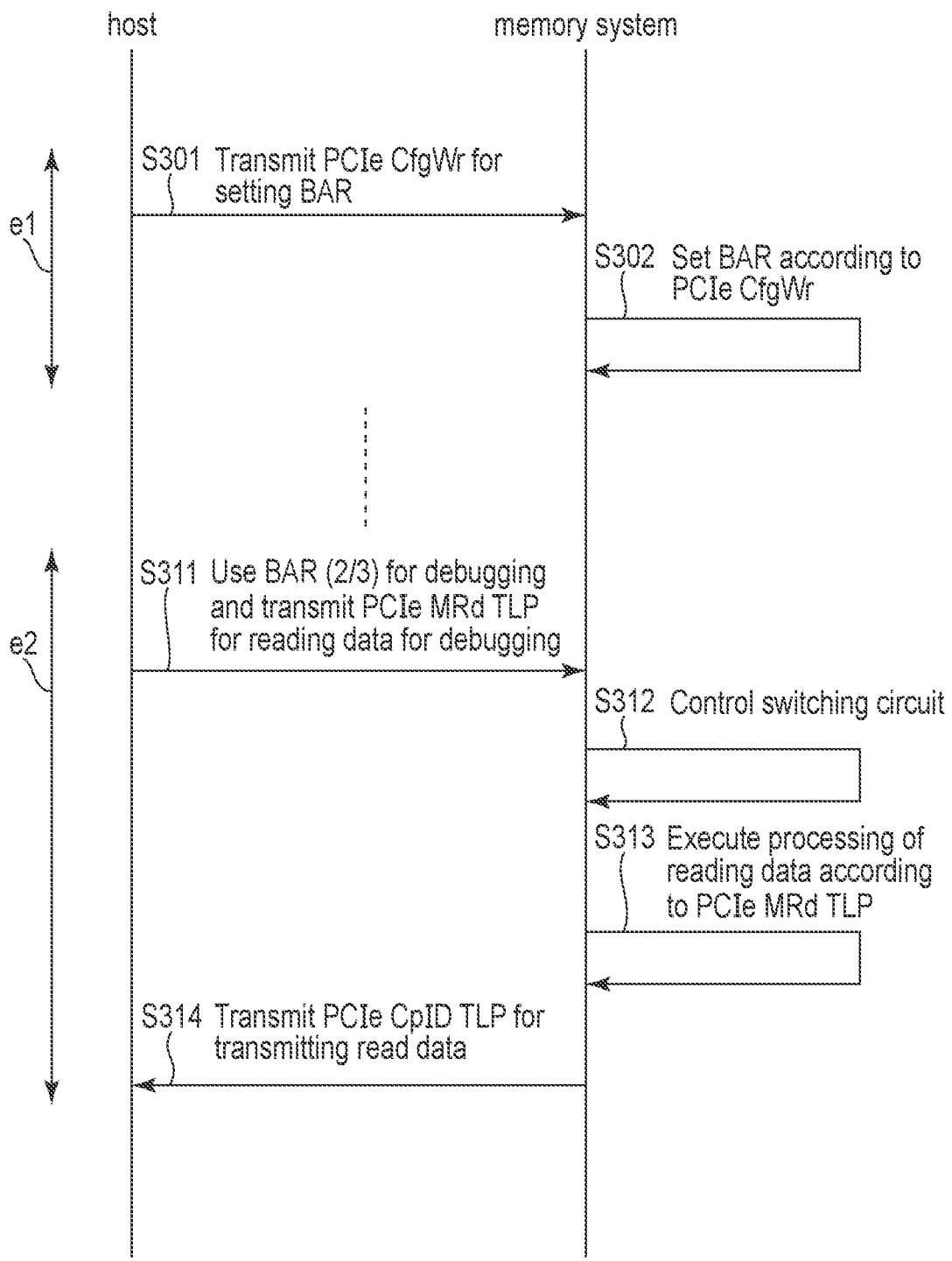
FIG. 8 is a sequence diagram illustrating a flow of operation in a debug mode of the memory system of the third embodiment and the host.

FIG. 8 is a sequence diagram illustrating a flow of operation of the host 2 and the memory system 1 when data is read from the memory system 1 in the debug mode.

Figure 9:
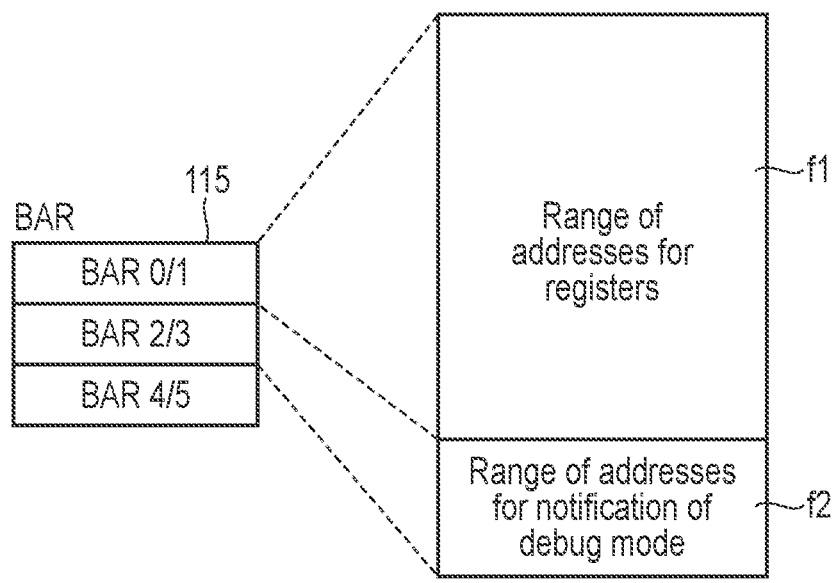
FIG. 9 is a diagram illustrating an example of a setting of a BAR in the memory system of the third embodiment.

First, the host 2 transmits a PCIe CfgWr TLP for setting the BAR 115 to the memory system 1 (S301). Specifically, the host 2 transmits the PCIe CfgWr TLP for setting the BAR 0/1 and the PCIe CfgWr TLP for setting the BAR 2/3 to the memory system 1. The memory system 1 sets the BAR 115 according to the PCIe CfgWr TLP from the host 2 (S302). Steps S301 to S302 for setting the BAR 115 are a flow of preparation for operating the memory system 1 in the debug mode (e1). FIG. 9 is a diagram illustrating an example of a setting of the BAR 115.

As illustrated in FIG. 9, in the BAR 0/1 of the BAR 115, information indicating a range of addresses used by the host 2 to access registers in the memory system 1 using the PCIe MRd/MWr TLP (f1) is stored. On the other hand, in the BAR 2/3 of the BAR 115, information indicating a range of addresses used by the host 2 to operate the memory system 1 in the debug mode (f2) is stored.

The description returns to FIG. 8. At the time of debugging, the host 2 uses the BAR 2/3, that is, designates an address within a range indicated by the information stored in the BAR 2/3, and transmits to the memory system 1 a PCIe MRd TLP for reading data for debugging (S311). The memory system 1 recognizes that the operation should be performed in the debug mode from the address designated by the PCIe MRd TLP, and controls the switching circuit 160 (S312).

Specifically, when the connection target of the external memory (DRAM 20, NAND memory 30) or the internal memory (SRAM 130, register in controller 10) is the normal circuit 140, the memory system 1 controls the switching circuit 160 to switch the connection target to the dedicated circuit 150.

Then, the memory system 1 executes processing of reading data from the external memory or the internal memory according to the PCIe MRd TLP transmitted from the host 2 including the physical address (S313). The memory system 1 transmits a PCIe CplD TLP for transmitting the read data to the host 2 (S314). Steps S311 to S314 are flows in which the host 2 reads data from the memory system 1 in the debug mode (e2).

As described above, in the memory system 1 of the third embodiment, the host 2 can read data in the memory system 1 using PCIe packets by operating the memory system 1 in the debug mode using a conventionally-unused BAR. In the debug mode, the memory system 1 configures a bypass path for executing data reading without passing through the normal circuit 140 that includes the CPU and the bus. Therefore, in the memory system 1, even when a failure such as a hang-up of the CPU or the bus occurs, data can be read. Data can be read not only from the NAND memory 30 but also from the DRAM 20, the SRAM 130, and the register in the controller 10 using the PCIe packets by the host 2, and thus it is possible to eliminate the need for work such as operating a dedicated debugger connected to the memory system 1.

As described above, the memory system 1 of each embodiment can facilitate information acquisition at the time of debugging.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a first memory;
a second memory; and
a controller capable of communicating with a host and configured to control the first memory,
wherein the controller includes:
a first decoder configured to decode a first command received from the host, the first command including a first address;
a second decoder configured to decode a second command received from the host, the second command including a second address;
a first circuit configured to access the first memory using the first address acquired from the first command by the first decoder;
a second circuit configured to access the first memory using the second address acquired from the second command by the second decoder;
a third circuit configured to access the second memory using a third address acquired from the second command by the second decoder, the third address being a physical address of the second memory;
a first register, a value stored in the first register being changeable by the host; and
a switching circuit configured to switch between the first circuit and the second circuit to access the first memory according to the value stored in the first register.

2. The memory system of claim 1, wherein:
the first address is a logical address associated with data stored in the first memory and the first circuit is configured to access the first memory using a physical address obtained from the logical address through a logical-to-physical address translation.

3. The memory system of claim 2, wherein:
the second address is a physical address of the first memory.

4. The memory system of claim 3, wherein:
the physical address indicates one of a channel, a block, and a bank of the first memory.

5. The memory system of claim 3, wherein the controller further includes the second memory.

6. The memory system of claim 1, wherein:
the first command is an NVM Express (NVMe) command conforming to an NVMe specification; and
the first register is an NVMe register accessible by a PCI Express (PCIe) packet conforming to a PCIe specification.

7. The memory system of claim 6, wherein:
the controller is configured to allow the host to transition the memory system to a debug mode by the host changing the value stored in the first register using a PCIe memory write transaction layer packet.

8. A memory system comprising:
a first memory;
a second memory; and
a controller capable of communicating with a host and configured to control the first memory,
wherein the controller includes:
a first decoder configured to decode a first packet received from the host, the first packet including first information logically indicating a location of a register in the controller;
a second decoder configured to decode a second packet received from the host, the second packet including second information indicating a physical location on the first memory;
a first circuit configured to access the register in the controller using the first information acquired from the first packet by the first decoder;
a second circuit configured to access the first memory using the second information acquired from the second packet by the second decoder;
a third circuit configured to access the second memory using third information acquired from the second packet by the second decoder, the third information indicating a physical location on the second memory;
a first register, a value stored in the first register being changeable by the host; and
a switching circuit configured to switch between an access to the register in the controller by the first circuit and an access to the first memory by the second circuit according to the value stored in the first register.

9. The memory system of claim 8, wherein the controller further includes the second memory.

10. The memory system of claim 8, wherein:
the first packet is a PCI Express (PCIe) packet conforming to a PCIe specification and is transmitted designating an address of a logical address space to which registers in the controller including the first register are allocated; and the first register is a PCIe register accessible by the first packet.

11. The memory system of claim 10, wherein:

the controller is configured to allow the host to transition the memory system to a debug mode by the host changing the value stored in the first register using a PCIe configuration write transaction layer packet.

12. The memory system of claim 11, wherein the controller is further configured to:

access the first memory according to a command received from the host, the command conforming to an NVM Express (NVMe) specification; and allow the host to transition the memory system to the debug mode after a link conforming to the PCIe specification is established before a communication conforming to the NVMe specification is established.

13. A memory system comprising:

a first memory;

a second memory; and a controller capable of communicating with a host and configured to control the first memory, wherein the controller includes:

a first decoder configured to decode a first packet received from the host when an address range included in the first packet is a first range;

a second decoder configured to decode the first packet received from the host when the address range is a second range different from the first range;

a first circuit configured to access a register in the controller using first information acquired from the first packet by the first decoder;

a second circuit configured to access the first memory using second information acquired from the first packet by the second decoder; and a third circuit configured to access the second memory using third information acquired from the first packet by, the second decoder, the third information indicating a physical location on the second memory.

14. The memory system of claim 13, wherein the controller further includes the second memory.

15. The memory system of claim 13, wherein the first packet is a packet that conforms to a PCI Express (PCIe) specification and is for accessing a base address register (BAR) specified in the PCIe specification.

16. The memory system of claim 15, wherein:

the controller is configured to allow the host to transition the memory system to a debug mode by the host specifying the address range included in the first packet to be the second range using a PCIe configuration write transaction layer packet.

17. The memory system of claim 16, wherein the controller is further configured to:

access the first memory according to a command received from the host, the command conforming to an NVM Express (NVMe) specification; and allow the host to transition the memory system to the debug mode after a link conforming to the PCIe specification is established before a communication conforming to the NVMe specification is established.

* * * * *